Sept. 19, 1967     A. LESSHEIM     3,342,146
PALLETS

Filed July 1, 1965     6 Sheets-Sheet 1

INVENTOR.
ARNO LESSHEIM
BY
Lockwood, Woodard, Smith & Weikart
Attorneys

Sept. 19, 1967     A. LESSHEIM     3,342,146
PALLETS

Filed July 1, 1965     6 Sheets-Sheet 2

INVENTOR.
ARNO LESSHEIM
BY
*Lockwood, Woodard, Smith & Weikart*
Attorneys

Sept. 19, 1967  A. LESSHEIM  3,342,146
PALLETS
Filed July 1, 1965  6 Sheets-Sheet 3

INVENTOR.
ARNO LESSHEIM
BY
Lockwood, Woodard, Smith & Weikart
Attorneys

INVENTOR.
ARNO LESSHEIM

Sept. 19, 1967 A. LESSHEIM 3,342,146
PALLETS
Filed July 1, 1965 6 Sheets-Sheet 5

INVENTOR
ARNO LESSHEIM
BY
Lockwood, Woodard, Smith & Weikart
Attorneys

Sept. 19, 1967        A. LESSHEIM        3,342,146

PALLETS

Filed July 1, 1965        6 Sheets-Sheet 6

INVENTOR
ARNO LESSHEIM
BY
Lockwood, Woodard, Smith & Weikart
Attorneys

United States Patent Office 3,342,146
Patented Sept. 19, 1967

3,342,146
PALLETS
Arno Lessheim, 109 Beech Grove Ave.,
Batesville, Ind. 47006
Filed July 1, 1965, Ser. No. 468,890
7 Claims. (Cl. 108—53)

This application is a continuation-in-part of my co-pending application Ser. No. 386,201, filed July 30, 1964, and entitled Pallets, now abandoned.

This invention relates generally to materials handling devices, and more particularly to pallets useful for supporting, storage, and movement of all types of materials including commodities and machinery.

Material storage and handling pallets of many types, sizes, and configurations, are known. All of the pallets now known have some very definite limitations or shortcomings. For example, most general purpose pallets occupy considerable space even when not in use. Special purpose pallets, in addition to requiring substantial space, are usually of very limited utility and, while they may be adequate for the purpose intended, are usually attainable only at cost penalties. Pallet constructions heretofore known do not lend themselves to handling or support of comparatively large and bulky units of material of unusual shape such as, for example, machinery.

Manufacturers, warehousemen, and others who use pallets, have additional problems even with general purpose pallets. Even though they can be obtained at comparatively low cost, the great numbers of general purpose pallets which are often used do represent a substantial investment. They are so constructed that when they become damaged, they frequently must be discarded. If high quality pallets are used, the investment is so substantial that it is necessary to keep records of the whereabouts of the pallets, particularly when merchandise is shipped out of a plant or warehouse on such pallets. Problems are multiplied when the pallets which have left the plant get mixed up with other pallets either at the destination or someplace between the destination and the plant or warehouse of origin. Also they frequently are damaged, ruined, or exchanged for pallets of different sizes, before being returned to the plant of origin, and may never be returned.

It is, therefore, a general object of the present invention to provide an improved pallet.

A further object is to provide a pallet construction which lends itself to quick and easy variation of the size and shape of the pallet without requiring any special tools or equipment.

A further object is to provide a pallet construction achieving the foregoing objects and which facilitates nesting of the pallets so as to minimize the space requirement therefor when not in use.

A still further object is to provide a pallet construction facilitating the use of a plurality of identical components arranged so as to complete the pallet and which can be separated, when desired, to reduce the size of or completely disassemble a pallet, the component members being adapted to storage in a very nominal space and to assemble into pallets without the use of tools.

A still further object is to provide a construction achieving the foregoing objects and which is well adapted to the use of a variety of well known and readily available and producible materials and manufacturing processes, and which can be attained at a low cost.

A still further object is to provide a pallet construction adapted to retention of high quality pallets in the plant to which they are assigned, and the shipment of merchandise on disposable portions thereof, which are of such low cost that it is feasible to consider them expendible.

It is a still further object to provide pallet constructions wherein there is a permanent pallet portion and a disposable pallet portion, and the permanent pallet portion is so constructed as to be of a high quality and yet attainable at low cost, and readily repairable.

A still further object is to provide pallet structure components of a type well suited to variations of size and arrangement of the pallets in which they can be used.

Described briefly, the simplest form of pallet made according to the present invention may include a pair of pivotable arms, both arms being of identical construction. Each arm is made of an elongated flat planar sheet or strip of material with three or more downwardly projecting frusto-conical cups formed therein, there being equal spaces between adjacent cups. The center cup of one of the arms is received in the central cup of the other arm to connect the two arms together so that they are rotatable about a vertical axis but securely restrained against separation in a horizontal direction.

The bottoms of the cups are then substantially coplanar and adapted to rest on a floor or other supporting surface. The cups thereby support the strips in vertical spaced relationship to the supporting surface and the spaces between the cups are adequate to receive the lifting forks of forklift trucks. The material to be supported and carried on the pallet is disposed on top of the arms.

The full nature of the invention will be understood from the accompanying drawings and the following description and claims.

Figure 11:
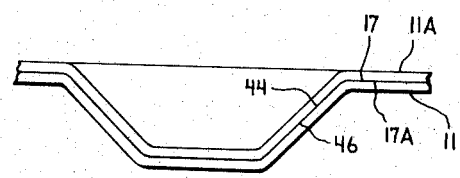
FIG. 11 is a fragmentary sectional view through nesting cups of the pallet of FIG. 3, the section being taken along the line 11—11 in FIG. 3 and viewed in the direction of the arrows.
Figure 12:
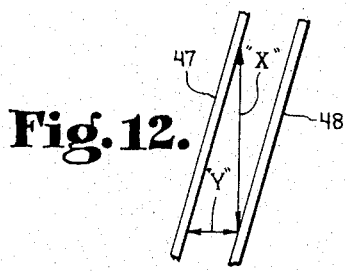
FIG. 12 is an enlarged illustration of the relationship between the outer wall of the inner cup and the inner wall of the outer cup which can occur as two of the pallet components are being assembled.
Figure 13:
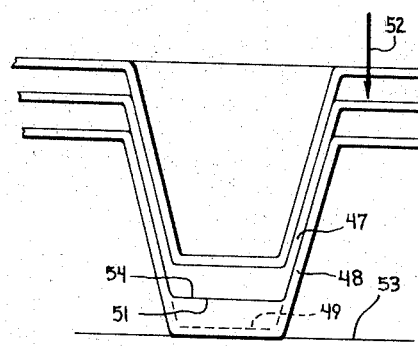
FIG. 13 is an enlarged fragmentary sectional view showing three nesting cups wherein the bottom thicknesses are increased so that load transmission from the member to which the upper cup is attached is accomplished through the bottom of the intermediate and lower cups rather than through the walls thereof.
Figure 14:
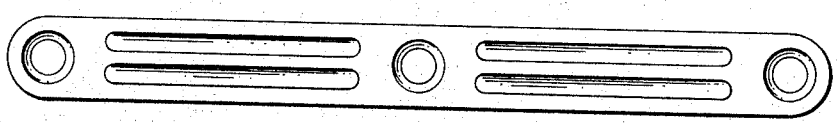
FIG. 14 is a pallet component with elongated reinforcing ribs in the bridging portions between the cups.

In FIGS. 11, 12, and 13, crosshatching is omitted to facilitate direct use of lead lines to surfaces hereinafter described, for clarity of illustration.

Figure 15:
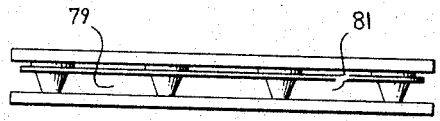

FIG. 15 is a side elevational view of a variation in pallet construction employing the pallet strips of my invention.

Figure 16:
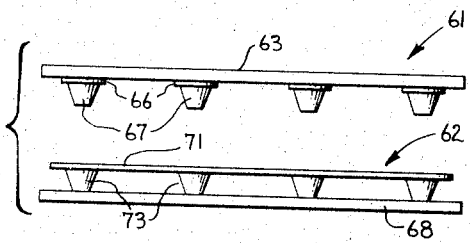

FIG. 16 is a side elevational view showing the upper half of the pallet of FIG. 15 raised directly above the lower half thereof.

Figure 17:
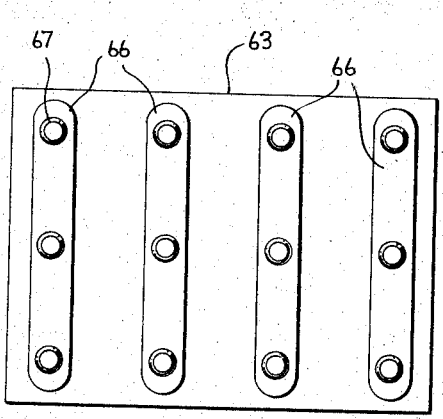

FIG. 17 is a bottom plan view of the upper half of the pallet of FIG. 15.

Figure 18:
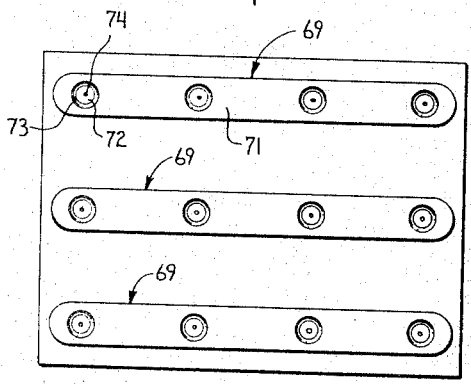

FIG. 18 is a top plan view of the lower half of the pallet of FIG. 15.

Figure 19:
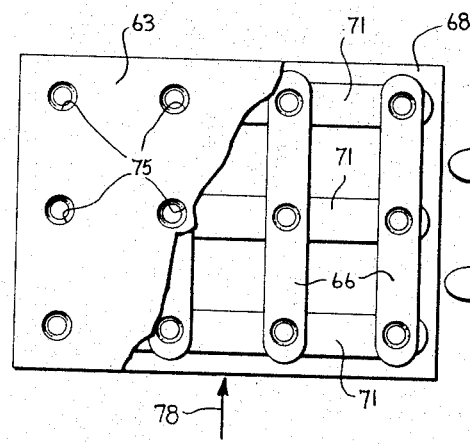

FIG. 19 is a top plan view of the complete pallet of FIG. 15 with a portion of the top deck broken away to show the relationship of the strips of the upper and lower halves of the pallet.

Figure 20:
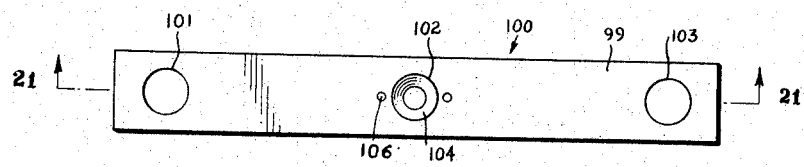

FIG. 20 is a top plan view of another typical pallet component employed in the practice of the present invention.

Figure 21:

FIG. 21 is a longitudinal section therethrough taken along the line 21—21 in FIG. 20 and viewed in the direction of the arrows.

Figure 22:
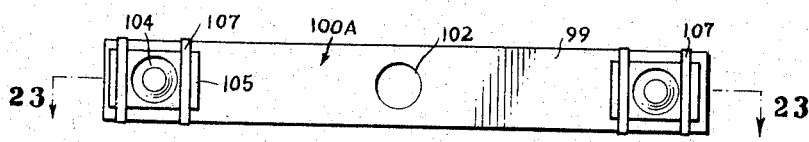

FIG. 22 is a bottom plan view of another typical pallet component wherein the cups are taped to the strip.

Figure 23:
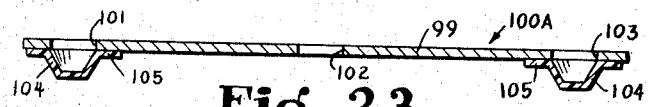

FIG. 23 is a longitudinal section through the center of the component of FIG. 22, taken along the line 23—23 in FIG. 22.

Figure 3:
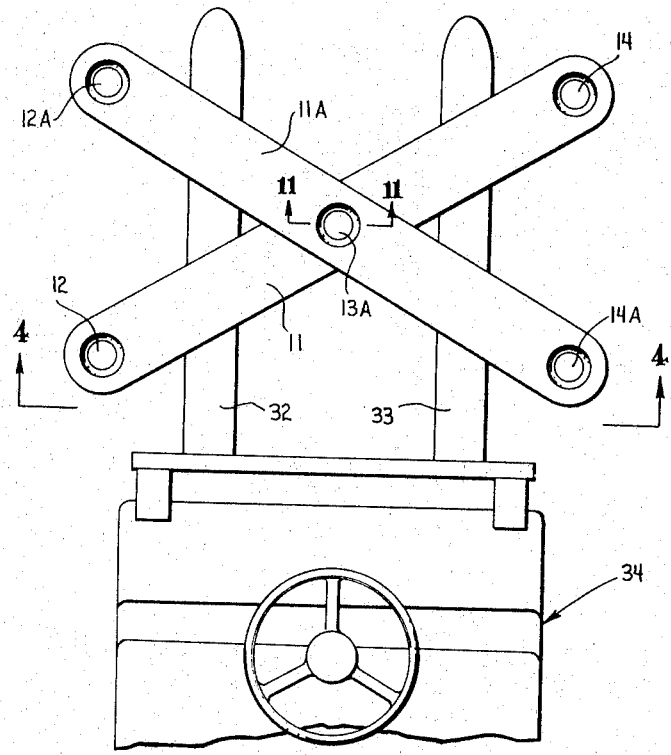
FIG. 3 is a top plan view of a basic pallet constructed of two of the components shown in FIGS. 1 and 2, and showing a fork-lift truck with the lifting forks thereof disposed under the pallet in position for lifting it.
Figure 24:
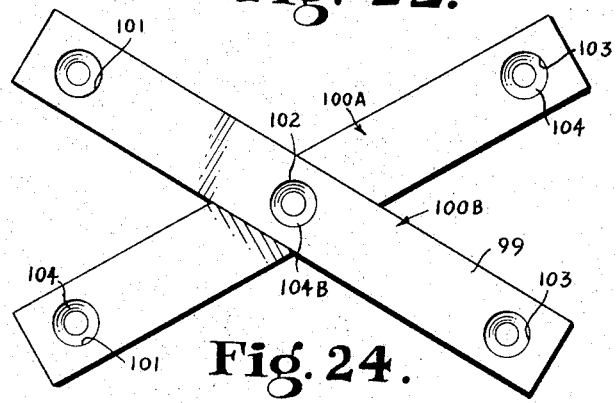

FIG. 24 is a top plan view of a pallet similar to that of FIG. 3, but employing the component of FIG. 22 with still another component like that of FIG. 22 but employing three cups rather than two cups.

Figure 5:
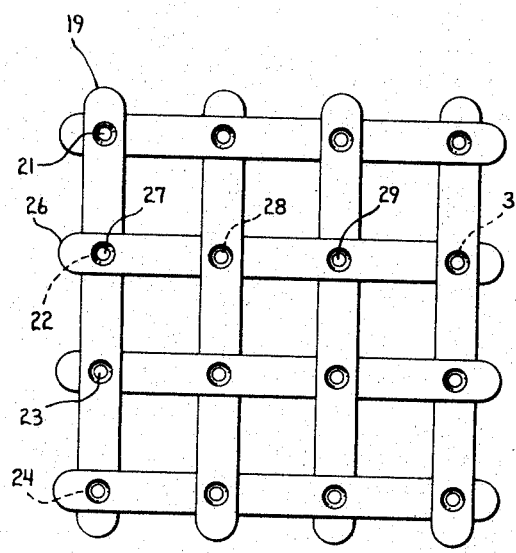
FIG. 5 is a top plan view of a pallet formed of components like those in FIGS. 1 and 2, but including an additional cup, which can be accomplished by lengthening the strip or changing cup spacing in the strip of original length.
Figure 25:
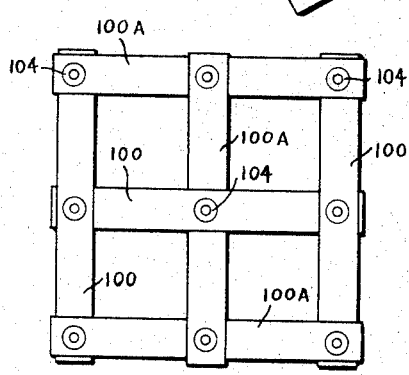

FIG. 25 is a top plan view on a reduced scale, of a pallet construction similar to that of FIG. 5 but employing the components of FIGS. 20 and 22.

Figure 26:
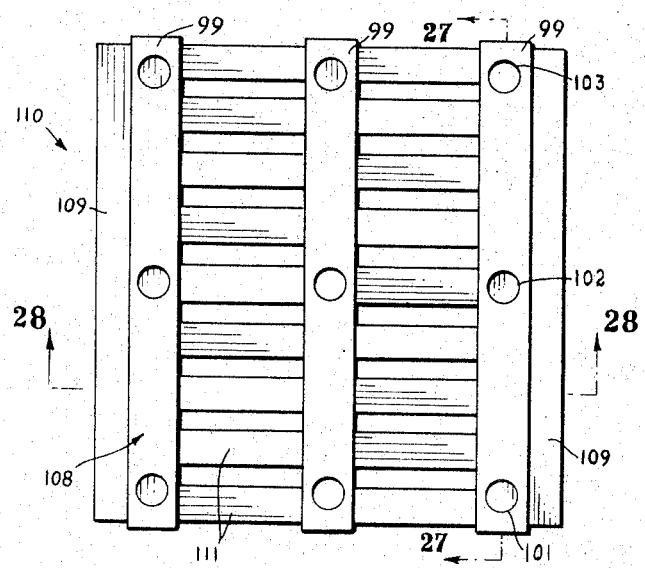

FIG. 26 is a plan view of a convertible pallet unit, shown in the attitude with three support modules disposed on top of the floor slats thereof.

Figure 27:
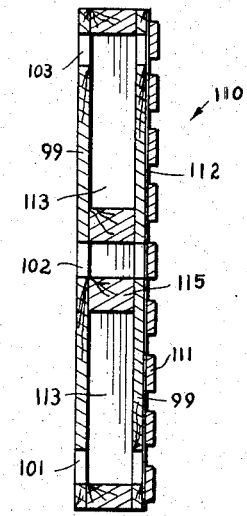

FIG. 27 is a section therethrough taken along the line 27—27 in FIG. 26 and viewed in the direction of the arrows.

Figure 28:
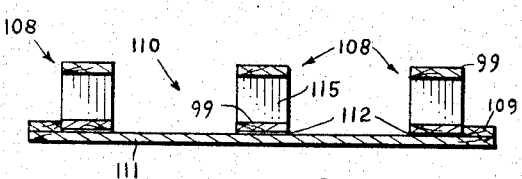

FIG. 28 is a section therethrough taken along the line 28—28 in FIG. 26 and viewed in the direction of the arrows.

Figure 29:
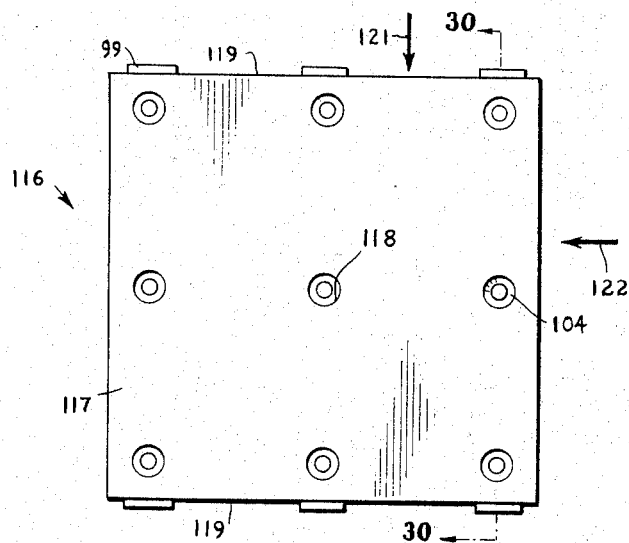

FIG. 29 is a top plan view of a combination pallet including a disposable pallet deck unit and the convertible pallet unit of FIG. 26.

Figure 30:
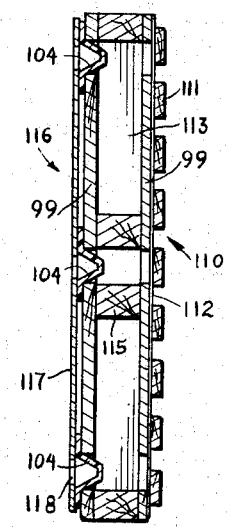

FIG. 30 is a section therethrough taken along the line 30—30 in FIG. 29 and viewed in the direction of the arrows.

Figure 1:
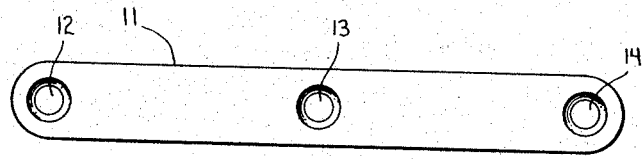
FIG. 1 is a top plan view of a typical pallet component employed in the practice of the present invention.
Figure 2:
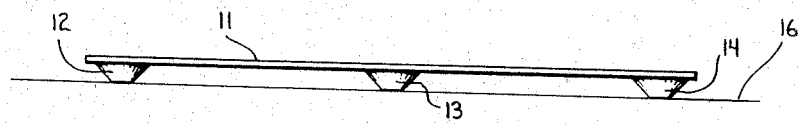
FIG. 2 is a front elevational view thereof.

Referring now to the drawings in detail, the pallets of the present invention are made of basic support units much like that illustrated in FIGS. 1 and 2 wherein a member in the form of an elongated flat strip 11 has downwardly extending projections which may be in the form of three integral downwardly projecting cups 12, 13, and 14 formed therein, these cups being frusto-conical in configuration, as shown better in FIG. 2. The entire unit may be made of plastic although it can be formed in metals or other materials, or it can be made of combinations of materials, if desired, as will be shown hereinafter. Because of the downwardly projecting cups, the strip 11 is supportable in vertically spaced relationship to a supporting surface 16 on which the bottoms of the cups rest.

To form a simple pallet from the unit shown in FIG. 1, two such units are disposed in crossing relationship as shown in FIG. 3, where the strip 11A having the cups 12A, 13A, and 14A therein is placed on top of the strip 11. The cup 13A is received in cup 13 such that the lower face 17A of the strip 11A lies on top of the upper face 17 of the strip 11 at the overlapping areas thereof near the central cups 13 and 13A thereof, the strips being thereby disposed in vertically abutting relationship at the joint thus formed. Because these cups fit each other, they permit relative rotation between the strips 11 and 11A about the colinear axes of the central cups. Also they prevent any relative movement horizontally between the cups. The colinear axes are on line 18 of FIG. 4.

By having the two pallet forming units identical, and because all of the cups in each unit are identical, nesting can be obtained not only between the central cups of the two strips but also between the outer cups. This is simply accomplished by placing the two strips on top of each other in precise alignment. In this way, the units can be stored and two of them will occupy no more vertical space than that occupied by one of them plus the thickness of the strip 11 of the other. Likewise, many more such strips for other pallets or for extensions of a single pallet can also be stacked in this type of nesting relationship in a very nominal space.

FIG. 5 illustrates an embodiment of the present invention wherein each of the units has four cups rather than three, and the pallet is formed of a first set of these units in horizontally spaced relationship extending in one direction, and a second set of the units in horizontally spaced relationship extending at 90° thereto. Every other one of the portions of any of the strips adjacent a cup therein is above the strip crossing it, with the next adjacent strip of the set being above the strip crossing it. In this way, the strips are woven together into a sort of web arrangement so as to complete an assembly which will remain together unless forcibly and intentionally taken apart.

In FIG. 5, the strip 19 has four cups 21, 22, 23, and 24, cups 22 and 24 being hidden by the cups of strips crossing the strip 19. One of these crossing strips is the strip 26 having cups 27, 28, 29, and 31 therein. Cup 27 nests in cup 22 of the strip 19 in the same way that the central cups of the strips 11 and 11A of FIGS. 1 through 4 nest. Cups 28 and 31 of the strip 26 are hidden by the strips crossing over strip 26 in the same manner as the cup 22 of strip 19 is hidden by strip 26 and the cup 27 therein. The strips 19 and 26 and the remaining strips of the pallet of FIG. 5 are, individually, flexible enough to allow the amount of bending thereof individually in order to interweave the strips in the manner shown so that when the assembly is complete the units are interlocked so that the assembly will not come apart unless intentionally and manually disassembled. Moreover, because of the nesting arrangement between all of the cups of all of the strips and at least one cup of some other strip, proper support for all portions of each strip is provided, together with relative rotational motion between crossing strips being possible. It in this type of rotatability which permits changing the configuration from the square of FIG. 5 to the diamond of FIG. 6. In either event, however, sufficient space is provided between the cups to accommodate the lifting forks 32 and 33 of the fork-lift truck 34 in the same way as they are accommodated in the simple pallet of FIG. 3.

Figure 6:
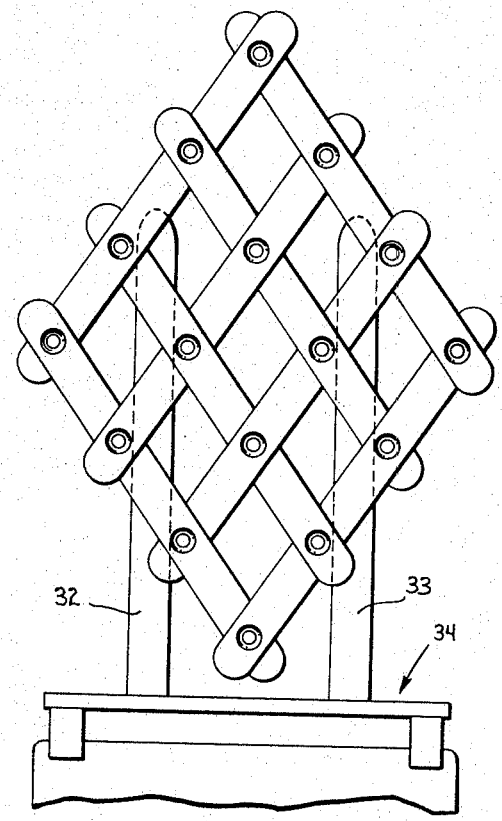
FIG. 6 is a top plan view of the pallet of FIG. 5 showing it formed into a parallelogram, with the lifting forks of a fork-lift truck still receivable thereunder for lifting and carrying the pallet.
Figure 7:
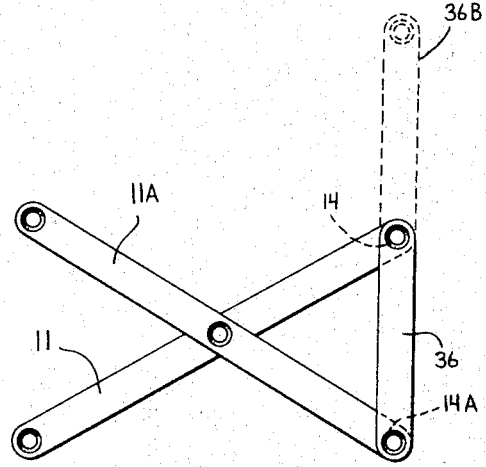
FIG. 7 is a top plan view of the pallet of FIGS. 3 and 4 but including an additional component to prevent rotation of the two arms with respect to each other.

Referring now to FIG. 7, the simple pallet of FIG. 3 is shown with a third strip 36 disposed between the cups 14 and 14A. This strip is provided with identical cups receiving the cups 14 and 14A in the same manner as the central cups of the two strips 11 and 11A are nested together. The provision of this additional strip prevents any relative angular motion between the strips 11 and 11A. It can readily be recognized that strip 36 can be identical to strips 11 and 11A with a portion 36B extending beyond the pallet, if desired. In this event, just the central cup and one end cup of strip 36 would receive the cups 14 and 14A. It is apparent from this, that the arrangement shown in FIGS. 5 and 6 can be locked in the same manner.

Figure 8:
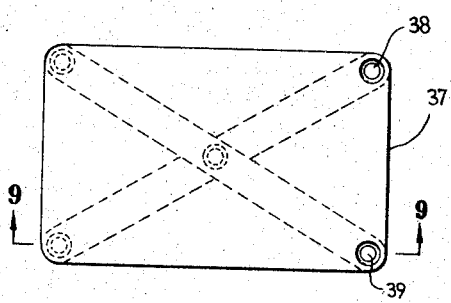
FIG. 8 is a top plan view of the same basic pallet as in FIG. 3, but with a cover plate thereon disposed to lock the angular relationship of the arms.
Figure 9:
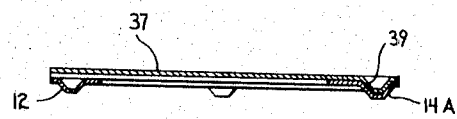
FIG. 9 is a sectional view taken along the line 9—9 in FIG. 8 and viewed in the direction of the arrows, again omitting the curvature as with FIG. 4, to simplify illustration.

Referring now to FIGS. 8 and 9, the basic pallet of FIG. 3 is again employed but has a flat cover 37 thereon. This type of cover makes the pallet more useful for supporting and moving commodities or materials in small containers. By providing cups 38 and 39 therein, which nest in the cups 14 and 14A the same locking effect as described with reference to FIG. 7 is attained. Yet the entire assembly requires no more vertical space than the pallet of FIG. 4 with the addition of the thickness of the board 37. Also the cover can have holes placed immediately above the cups and thus enable nesting of a stack of these pallets.

Figure 10:
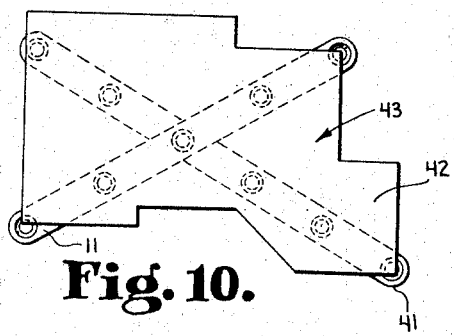
FIG. 10 is a top plan view of a variation wherein one of the arms is greater in length than the other to accommodate handling of a load of unusual shape.

FIG. 10 illustrates the application of the basic pallet of FIG. 3 to the movement of a machine having an unusual shape. It may be desirable to move machinery around in a manufacturing plant or elsewhere. Many machines have a basic frame structure which could be supported on the pallet having standard generally rectangular dimensions. Often, however, some part of the machine which also needs support during transportation, extends beyond the main frame of the machine. For example, an automatic screw machine may have a parts receiving bin connected thereto which would extend beyond the main frame of the machine. Other machines may have chip storage hoppers or bins mounted thereto. The device of the present invention lends itself quite well to transportation of such machines, because by the selection of basic units of varying lengths, a pallet assembly can be made having the precise configuration desired. An example is illustrated in FIG. 10 where the strip 11 may be somewhat shorter than strip 41, the additional length of the strip 41 being used to provide support for the portion 42 of the machine 43.

In order to obtain the optimum load transmission and minimum space requirements for the pallet of the present invention, good nesting of the cups is quite desirable. As shown in FIG. 11, if the wall 44 of the cup 13 is at an angle of 45° with respect to the top surface 17 of the strip 11, and the lower conical wall 46 of the cup 13A is at an angle of 45° with respect to the underside 17A of the strip 11A, perfect nesting can occur. This, of course, assumes that the thickness of the material in the cups of both strips is identical and uniform. Frequently, however, it may be found that it is more desirable to have steeper sloping walls in the cups. Such a relationship is illustrated in FIG. 12 where the dimension X between facing surfaces of walls 47 and 48 of cups to be nested, is greater than the dimension Y between said facing surfaces. In this event, even though the materials of the cup walls are comparatively thin, the cups will not nest far enough for the lower face of the bottom of the upper cup to directly contact the upper face of the bottom of the lower cup. This is illustrated in FIG. 13 where the dotted outline 49 represents the place where the upper face of the bottom of the outer or lower cup would be located when the lower face 51 of the bottom of the cup 47 is located as shown. In this type of arrangement, a vertically applied load on the strip supported by the cup 47 and indicated by the arrow 52, for example, would not be transmitted to a supporting surface or ground 53 through the bottom of the intermediate cup. It would instead be transmitted laterally and vertically through the wall 48 of the outer or lower cup and through the bottom thereof to the ground. In order to avoid this type of load transmission which would also tend to wedge the cups too tightly together and make removal thereof difficult, the bottom of the outer cup may be increased in thickness to equal dimension X so as to place the upper surface 54 of the bottom of the outer cup in direct contact with the bottom surface 51 of the bottom of the intermediate cup as shown in FIG. 13. In this way, the load 52 can be transmitted through the walls 47 of the intermediate cup and through the bottom thereof and the bottom of the outer cup to the ground or other supporting surface 53. In this way, the cups will not be wedged together to such an extent as could cause difficult separation thereof in the event it was desired to disassemble or rearrange the pallet component units. The same effect can be obtained by increasing the thickness of the bridging portion between cups, rather than the cup bottom thickness, if desired.

In certain instances, it may be found desirable to employ a wedge or force fit between the cups. The degree of force fitting will be determined largely by the angle of the cup walls and the thicknesses thereof, as well as the materials used.

Referring now to FIGS. 15 through 19, there is shown a pallet construction according to another embodiment of my invention. The purpose of this embodiment is to provide a pallet construction whereby a large number of loaded pallets can be stacked vertically and yet no damage will be done to one pallet by another or to a supporting surface, even though there may be an accumulation of a tremendous vertical load on the lowermost pallets.

According to the construction of this type of pallet, upper and lower pallet sections 61 and 62 are provided. The upper pallet section 61 includes a deck 63 which may be made of wood or other suitable material. This board has a plurality of the strips 66 of the present invention mounted to the bottom thereof in parallel horizontally spaced relationship as shown in FIG. 17. Typically these strips are made of plastic and are glued to the bottom of the deck, although other materials and fastening means may be found to be satisfactory. In the illustrated example, each of the strips has three cups 67 projecting downwardly and tapering inwardly.

The lower section 62 of the pallet has the deck 68 with three identical strips 69 mounted to the top surface thereof as shown in FIG. 18. In this instance, however, instead of the bridging portions 71 of the strips being glued or otherwise secured to the face of the deck as is the case for the top section of FIG. 17, the bottoms 72 of the cups 73 are glued or secured by other fasteners 74 to the upper face of the deck 68. So it is seen, particularly by reference to FIG. 16, that the bridging portions 71 of the strips of the lower section of the pallet are disposed in parallel vertically spaced relationship to the top surface of the deck 68. The strips on the lower deck section 62 are shown with four cups therein, but more or less could be employed as is the case with the strips on the upper pallet section 61. It is important, however, that the number and spacing of cups and strips be such that when the upper section is lowered onto the lower section, the cups 67 nest properly in the cups 73 so as to obtain the best possible load transmission between the deck 63 and deck 68. In this way the material selected for the strips as well as the decks can be such that loads can be stacked on the deck 63 and transmitted through the deck 68 to a supporting surface without undue load concentration at any point on the supporting surface. The advantage of this can be well appreciated where crushable or damageable merchandise may be stacked upon each of a series of pallets of this construction, with the pallets of the series being stacked in turn upon each other.

So in the embodiment of FIG. 15, the support units 69 on the deck 68 serve as support modules on a base. An additional feature of this construction will be understood upon further reference to FIGS. 15 through 19. This important feature of the pallet is the fact that when the upper and lower sections are assembled, the strips on the upper section extend in directions at right angles to the direction of the strips of the lower section. This is well shown in FIG. 19 where a portion of the deck 63 of the top section is broken away to show that the strips 66 thereof having the cups 67 received in the cups 73 of the strips 71 of the lower pallet section, are at right angles to strips 71. This means that when a fork-lift truck approaches from an end of the pallet in the direction of the arrow 76, the lifting forks 32 and 33 thereof pass between adjacent cups of the strips and under the strips 66 whereby, upon raising the lifting forks, the upper section of the pallet can be separated from and lifted above the lower section thereof such as indicated in FIG. 16. This upper pallet section, with the load thereon, can then be moved by the lift-truck into a semi-trailer or other vehicle for transportation therein to some destination. The lower section of the pallet can remain in the plant for use with another upper section which may come into the factory or another semi-trailer bringing in an inbound shipment of materials, or additional upper sections may be kept in the plant inventory. In order to facilitate nesting of upper sections during storage thereof, apertures 75 (FIG. 19) are provided in the upper deck immediately above the cups 67 and in registry therewith, to receive the downwardly projecting cups of another top section when stored therewith, without the lower sections. In any event, however, it is unnecessary to use both sections of the pallet for shipping merchandise, where the load distribution feature of the deck 68 of the lower pallet section is not essential.

To employ the entire pallet and lift and carry it, the same fork-lift truck can be employed. In this instance it is only necessary to approach the side of the pallet such as in the direction of the arrow 78, for example, so that the lifting forks thereof enter the spaces such as 79 and 81 of FIG. 15 between the cups and below the bridging portions 71 of the strips of the lower pallet section and in a direction generally perpendicular thereto. Then, when the lifting forks are raised, both the upper and lower pallet sections will be raised simultaneously and retained together and the complete pallet with load thereon can be moved about in the warehouse and a large number of loaded pallets can be stacked upon each other without damage to any.

It should be apparent that in order to lift just the upper pallet section the fork-lift can enter from either of the opposite ends. In order to lift both pallet sections the fork-lift can enter from either of the opposite sides.

In lifting the upper pallet section only, if it is desirable that the forks engage the strips thereof to lift the deck, rather than contact only the lower face of the deck, the upper and lower sections must be assembled so that the strips of the upper section are transverse to the strips of the lower section. This can be assured by making the spacing of cups in one direction different from that in another direction, or by providing in the two directions a difference in the number of cups or the number of strips as in the illustrated example. Color coding on the decks could also be employed, if desired, with pallets wherein the spacing and number of strips on the upper and lower sections are identical.

The novel strips of the present invention make it possible to vary distance between strips and arrange strips to concentrate the support cups where the greatest load concentration will be. A pallet manufacturer or user can keep an inventory of strips with various cup numbers and spacings to serve any purpose desired.

In FIG. 20, the support unit 100 is made of a combination of materials and includes a strip 99 made of a very low cost material, the quality of material being consistent with the service to be performed. An example of a suitable material is plywood. This strip has two identical apertures 101 and 103 therein adjacent the opposite ends thereof, and a third aperture 102 centrally located therebetween and identical thereto. Below the central aperture is a frusto-conical cup 104 having the flange 105 thereon secured by rivets or staples 106 to the strip 100. The axis of the cup is colinear with the axis of the aperture 102, and the cup may be made of any moldable or stampable material.

The support unit 100A of FIGS. 22 and 23 may employ strip 99 identical to that of unit 100, but in this instance cups 104 are secured to the strip under the apertures near the end and no cup is provided under the central aperture 102. Also, instead of stapling the cup flanges to the strip, adhesive tape 107 is employed.

Figure 4:
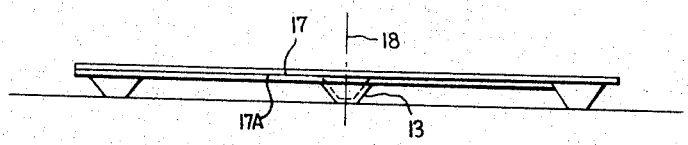
FIG. 4 is an elevational view of the pallet of FIG. 3 resting upon a floor surface, the view being taken in the direction of the arrows 4—4 in FIG. 3, and not showing the slight curvature of the strips which may result from overlapping of identical strips.

In FIG. 24, the support unit 100A of FIG. 22 and 23 is combined with a support unit 100B which is like 100A except for the addition of a cup 104B at the central aperture 102, this cup being received in the aperture 102A of the strip 100A. The cup 104B is fittingly received in the aperture 102 so that the axes of this cup and aperture are colinear and a pallet functioning the same as that of FIGS. 3 and 4, is obtained. Cup 104B may be identical to cups 104.

Even though the three different pallet support units 100, 100A, and 100B, which have just been described, are different from each other from the standpoint of location of the cups with reference to the apertures therein, the units are identical so far as the dimensions of the apertures therein and cups thereon and spacing therebetween, is concerned. The result is that they can all be stacked together just as was the case with the support units of FIG. 1, for storage in a minimum of space.

The strips also lend themselves well to a web-type pallet of the general type shown in FIGS. 5 and 6 and also in FIG. 25. The desired results can be achieved with the usage of a minimum of cups, by employing the units of FIGS. 22 and 20.

For this purpose, the end cups of two of the units 100A are received in the end apertures of two of the units 100. The end cups of one of the units 100A are received in the central apertures of two of the units 100A. The central cup of one of the units 100 is received in the central aperture of one of the units 100A. The central cups of the other two units 100 are received in the end apertures of the third unit 100. This low-cost interwoven and interlocked arrangement of units can be moved to a parallelogram shape like that of FIG. 6, if desired, because the cups pilot in the apertures in which they are received and the upper face of each strip around its aperture receiving the cup of another strip abuttingly engages the lower face of the cup flange of the other strip.

Although it has been mentioned that the cups may be stapled, riveted, or secured to the strips by adhesive tape, they may also be glued to the pallet deck of FIGS. 29 and 30, which will be described hereinafter. In any event the cups can serve as guide or pivot members or receptacles or support legs.

From the foregoing description, it will be apparent that exactly the same wooden strip 99 having three identical spaced apertures therein can be used to obtain any of the units 100, 100A, or 100B, which have just been described. Also, more or less apertures and cups can be employed to meet various expected load requirements. This same strip 99 is a basic component part of each of the support modules 108 of the convertible pallet unit 110 of FIGS. 26 through 30. Each of these modules includes a pair of these strips 99 vertically spaced by the spacer and support blocks 115. In each module, one of these blocks is provided between the outer ends of two of the strips 99 and one at each side of the central aperture of the two strips. Accordingly the upper and lower strips of each support module are disposed in vertical alignment as are the apertures therein.

In the illustrated embodiment, a floor unit or base is provided by a pair of horizontally spaced side members 109 with a series of horizontally spaced cross members 111 connected therebetween. These side members and cross members are typically made of wood, although other low-cost materials may also be used. As shown in FIGS. 27 and 28, the lower strips 99 of each of the modules have an elongated strip 112 of double-faced pressure-sensitive adhesive tape thereon. This tape adheres to the top surfaces of the slats 111 when the modules are pressed down onto them to complete the convertible pallet unit. The spacing between the center module and the two outer modules is usually selected such that the lifting forks of a fork-lift truck can be received therebetween. Likewise the spaces between the support blocks 115 near the central aperture, and the support blocks 115 near the outer apertures are selected so that sufficient room will be provided therebetween to receive the lifting forks of a fork lift truck.

The purpose of these spacing provisions will be apparent upon reference to FIGS. 29 and 30, wherein the pallet deck unit or upper deck section 116 including the deck board 117 and cups 104 glued to the bottom surface thereof is received on top of the support modules of the lower section of the pallet assembly. This deck board may be made of corrugated fiberboard or plywood or any other material suitable for the purpose. Apertures 118 are provided therein above each of the cups 104 so that these deck units can be stacked conveniently by themselves for storage in a minimum of space. When received on the support modules, the cups are received fittingly in the apertures in the strips 99 of the support modules.

When a deck unit is received on and supported by the modules as shown in FIGS. 29 and 30, the flanges of the cups rest on the strips 99 and, although substantial space is shown between the upper strips 99 and the deck board 117 between the cups, this is for convenience of illustration and may well be closed up in actual use of the pallet assembly with a load on the pallet, the strips thus supporting a portion of the load on the pallet. Of course the portions of the strips surround the apertures always support the portion of the pallet load transmitted thereto through the cup flanges.

This pallet assembly can conveniently be handled by a fork lift truck in the same manner as described above with reference to FIGS. 15 through 19. When the lift truck approaches either end of the pallet such as by moving in the direction of the arrow 121, the lifting forks will move between the modules and upon raising the forks, the deck unit will be lifted from the modules, whereupon it can be transported into a truck, for example, for shipping. This deck unit, being a low-cost unit, is disposable. To lift the complete assembly of the deck unit and convertible pallet unit, the lift truck would approach from either side, such as in the direction of the arrow 122, whereupon the lifting forks would move under the upper strips of each of the modules and, upon raising the forks, would lift not only the deck but the convertible pallet portion as well. This combination is advantageous where palletized goods are to be stacked to considerable heights and the goods or merchandise would not of itself satisfactorily support the concentrated loads which would be applied by the cups if they rested directly on top of the merchandise. In this instance, the large load distributing surface provided by the lower faces of the slats, or solid plywood in the event the base unit is made of solid plywood rather than the slat construction illustrated, could be accommodated by the merchandise so as to permit stacking to considerable heights so as to obtain maximum load distribution over the whole pallet area.

The convertible pallet unit itself can be used as a pallet quite conveniently by inverting it so that the slats are above the support modules. It can then be used as a conventional pallet for whatever period desired.

Although the support modules may be secured to the slats by screws or bolts, the use of the pressure sensitive adhesive, as described above, makes it possible to separate a module from the slats by pulling vertically thereon. This facilitates repair or, in the event that the arrangement of cups to be used on a deck board is different from that shown, permits location of the modules wherever required to accommodate the particular cup arrangement desired.

From the foregoing description, it will be readily recognized that the present invention is well adapted to achievement of the objects set out herein. A wide variety of materials can be used, dimensions can be varied considerably, as desired, and arrangements can be varied considerably. Therefore, while the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:
1. A method of handling a pallet comprising steps of:
approaching a side of a pallet with a pair of elongated lifting members extending perpendicular to the side of the pallet and inserting said members in a space between upper and lower pallet members;
lifting said lifting members to lift said pallet above a supporting surface;
transporting said pallet to a location for deposit;
lowering said pallet to a supporting surface in said deposit location;
removing said lifting members from the space between said pallet members;
approaching an end of said pallet in a direction parallel to said side thereof with a pair of lifting members extending parallel to said side thereof;
inserting said members into a space between supports disposed between said first and second pallet members;
and raising said lifting members to separate the upper pallet member from the lower pallet member;
and removing said upper pallet member away from said deposit location, separate from said lower pallet member.
2. A pallet comprising:
first deck means having a plurality of downwardly extending projections on the lower face thereof;
second deck means having a plurality of projection receiving strips secured thereto, said projections being received in said strips, portions of said strips between said projections being disposed in parallel vertically spaced relationship to and above the upper face of said second deck, whereby a lifting fork moving under said first deck means and substantially parallel to said strips is effective to raise said first deck means separately from said second deck means, and whereby a lifting fork moving under said strip portions between said projections is effective to simultaneously raise as a unit, both said first deck means and said second deck means.
3. A pallet comprising:
a pair of elongated side members in parallel horizontally-spaced relationship;
a plurality of parallel, horizontally-spaced elongated cross members having their ends connected to said side members, said cross members being disposed in a first horizontal plane and forming a flat surface adapted to support a load;
a plurality of support modules, each support module including a pair of horizontally-extending, vertically-spaced elongated strips of a length at least as great as the length of the said side members,
said strips being identical and having a plurality of horizontally-spaced apertures in a line from one end of each strip to the other end of each strip;
each support module further including a plurality of spacer and support blocks disposed in spaced relationship to each other and between the said strips of the module and separating the strips, said blocks supporting said strips in vertically-spaced relationship,
a double faced pressure sensitive adhesive tape extending along the lower face of the lower strip of each module and attaching the lower strip of each module to upper face portions of each of said cross members whereby said modules are fastened to said cross members and the upper strips thereof are disposed in a second plane parallel to said first plane,
said modules being disposed in parallel horizontally spaced relationship to each other, the two modules most remote from each other being disposed in side-by-side relationship to inner marginal edges of said side members, each module being removable from said cross members and replaceable thereon in a different location, with the adhesive tape on said module providing the adhesive attachment in the various locations;

a deck board having parallel side marginal edges and parallel end marginal edges, said deck board being generally rectangular and having a flat top face and made of an inexpensive substantially rigid material, said deck board including a plurality of support units adhesively secured to the lower face thereof, each of said support units including a frusto-conical cup tapering downwardly and inwardly toward a flat bottom, and upwardly and outwardly toward a mounting flange, the mounting flange of each of said cups being adhesively attached to the lower face of said deck board, said cups being arranged in rows and columns and fittingly received in the apertures of upper strips of said modules, the deck board portion facing an upper one of said module strips between successive cups in line with the module strip being disposed in closely spaced vertical relationship to the strip and supportable by said strip whereby said cross members and support modules support said deck board, spaces between said support blocks of said modules being aligned to accommodate entrance of lifting members of a fork-lift truck in a direction transverse to said strips of said modules to enable lifting the support modules and cross members as well as the deck board simultaneously, the horizontal spaces between adjacent modules being spaced to accommodate entrance of the lifting forks of a fork-lift truck in a direction parallel to said module strips to enable lifting of said deck board apart from the support modules and cross members, said cross members and support modules being separable thereby from said deck board and invertible to provide a separate pallet with the cross members thereupon resting on top of the support modules and providing a substantial flat horizontal area for support of commodities.

4. A pallet comprising:

a pair of elongated side members in horizontally spaced relationship;

a plurality of elongated cross members connected to said side members, said cross members being disposed in a first horizontal plane and forming a flat surface adapted to support a load;

a plurality of support modules, each support module including a pair of horizontally-extending, vertically-spaced elongated strips of material, the upper strip of each module having a plurality of horizontally-spaced apertures therein, each support module further including a plurality of spacer and support blocks disposed between the said strips of the module and separating the strips, said blocks supporting said strips in vertically-spaced relationship, means attaching the lower strip of each module to upper face portions of said cross members whereby said modules are fastened to said cross members and the upper strips thereof are disposed in a second plane parallel to said first plane, at least some of said modules being disposed in horizontally-spaced relationship to each other, a deck unit including a board with a plurality of support legs secured to the lower face thereof, each of said support legs including a portion tapering downwardly and inwardly, said support legs being arranged in rows and columns and fittingly received in the said apertures of upper strips of said modules, the deck board supportable by said upper strips whereby said cross members and support modules support said deck unit, spaces between said support blocks of said modules accommodating entrance of lifting members of a fork-lift truck in a direction transverse to said strips of said modules to enable lifting the support modules and cross members as well as the deck unit simultaneously, the spaces between adjacent modules accommodating entrance of the lifting forks of a fork-lift truck in a direction parallel to said module strips to enable lifting of said deck board apart from the support modules and cross members, said cross members and support modules being separable thereby from said deck board and invertible to provide a separate pallet with the cross members thereupon resting on top of the support modules and providing a substantial flat horizontal area for support of commodities.

5. A pallet comprising:

base means disposed in a first horizontal plane;

a plurality of support modules, each support module having an upper surface with a plurality of horizontally-spaced apertures therein, each support module further including a plurality of horizontally-spaced support portions therein, means attaching each module to upper face portions of said base means whereby said upper surfaces of said modules are disposed in a second plane parallel to said first plane, at least two of said modules being disposed in horizontally-spaced relationship to each other, a deck unit including a board with a plurality of support legs secured to the lower face thereof, each of said support legs including a portion fittingly received in one of said apertures, said deck board being supportable by said modules, spaces between said support portions of said modules accommodating entrance of lifting members of a fork-lift truck in a direction tranverse to said modules to enable lifting the support modules and cross members as well as the deck unit simultaneously, the spaces between adjacent modules accommodating entrance of the lifting forks of a fork-lift truck in a direction parallel to said module strips to enable lifting of said deck board apart from the support modules and cross members.

6. A pallet comprising:

base means disposed in a first horizontal plane;

a plurality of support modules, each support module having a plurality of horizontally-spaced apertures therein, each module being attached to upper face portions of said base means, at least two of said modules being disposed in horizontally-spaced relationship to each other, a deck unit including a board with a plurality of support legs secured to the lower face thereof, each of said support legs including a portion fittingly received in one of said apertures, said deck board being supportable by said modules.

7. A pallet comprising:

base means disposed in a first horizontal plane;

a plurality of support modules, each support module having a plurality of horizontally-spaced apertures therein, each module being attached to upper face portions of said base means, at least two of said modules being disposed in horizontally-spaced relationship to each other.

a deck unit including a board with a plurality of support legs secured to the lower face thereof, each of said support legs including a portion fittingly received in one of said apertures, said deck board being supported by said modules, each support module having an upper surface extending beyond end marginal edges of said board and supporting the end edges of the board.

References Cited

UNITED STATES PATENTS

| | | | |
|---|---|---|---|
| 258,511 | 5/1882 | Vullier | 220—23.2 |
| 1,971,642 | 8/1934 | Champlin | 248—97 |
| 2,544,657 | 3/1951 | Cushman | 108—53 |
| 2,691,499 | 10/1954 | Watts | 108—56 |
| 2,706,099 | 4/1955 | Whalley | 108—53 |
| 2,709,559 | 5/1955 | Geisler | 108—51 |
| 2,738,153 | 3/1956 | Frase | 108—58 |
| 2,841,350 | 7/1958 | Chronister | 108—56 |
| 2,876,827 | 3/1958 | Mirrione | 297—452 X |
| 2,903,218 | 9/1959 | Altenburg | 108—53 |
| 3,199,469 | 8/1965 | Sullivan | 108—53 |
| 3,228,358 | 1/1966 | Sepe et al. | 108—58 |

FOREIGN PATENTS 337,125  4/1959  Switzerland.

DAVID J. WILLIAMOWSKY, *Primary Examiner.*

FRANK B. SHERRY, *Examiner.*

G. O. FINCH, *Assistant Examiner.*